(12) United States Patent
Fujita

(10) Patent No.: US 6,735,241 B1
(45) Date of Patent: May 11, 2004

(54) CDMA RECEIVER

(75) Inventor: Roi Fujita, Kawasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 779 days.

(21) Appl. No.: 09/609,647

(22) Filed: Jul. 3, 2000

(30) Foreign Application Priority Data

Jul. 8, 1999 (JP) .......................................... P11-194726

(51) Int. Cl.[7] .............................. H04J 13/04; H04L 7/04
(52) U.S. Cl. ........................................ 375/149; 375/362
(58) Field of Search ................................. 375/130, 140, 375/144, 145, 147, 148, 149, 344, 362; 370/479; 455/436

(56) References Cited

U.S. PATENT DOCUMENTS

| | | |
|---|---|---|
| 5,533,014 A | 7/1996 | Willars et al. |
| 5,764,687 A | 6/1998 | Easton |
| 5,883,888 A | 3/1999 | St-Pierre |
| 5,953,324 A | 9/1999 | Adachi |
| 6,219,391 B1 * | 4/2001 | Nakano ...................... 375/346 |
| 6,560,272 B1 * | 5/2003 | Komatsu ..................... 375/147 |
| 6,606,363 B1 * | 8/2003 | Atarius et al. .............. 375/362 |

FOREIGN PATENT DOCUMENTS

| | | |
|---|---|---|
| JP | 7030514 | 1/1995 |
| JP | 10136429 | 5/1998 |
| JP | 11068698 | 3/1999 |
| WO | 97/01227 | 1/1997 |

OTHER PUBLICATIONS

An English Language abstract of JP 10–068698.
An English Language abstract of JP 10–136429.
An English Language abstract of JP 7–030514.

* cited by examiner

Primary Examiner—Amanda T. Le
(74) Attorney, Agent, or Firm—Greenblum & Bernstein, P.L.C.

(57) ABSTRACT

In a CDMA receiver of the present invention in accordance with the IS-95 standard, at least one pilot filter is provided externally of a loop for synchronization tracking. Then filtering processing of a pilot signal and synchronization tracking processing is performed concurrently. Further using synchronization establishment information transmitted from a base station, a rate for the synchronization tracking is adaptively changed. Furthermore a time constant of the pilot filter independently provided is set using information from an AFC circuit. According to the present invention, it is possible to perform the filtering processing of the pilot signal assuredly, and to improve the synchronization tracking capability.

4 Claims, 7 Drawing Sheets

CDMA RECEIVER

BACKGROUND OF THE INVENTION

1. Field of the Invention

The present invention relates to a receiver used in a Code Division Multiple Access (CDMA) communication system.

2. Description of the Related Art

As CDMA digital car telephone and portable telephone systems, there is known a North American standard system (TIA IS95).

In the standard specification (TIA/EIA/IS-95-A) published by the TIA(Telecommunications Industry Association), chapter 6 has a description concerning functions required for a mobile station, and chapter 7 has a description concerning functions required for a base station.

A brief outline of the North American standard system is as follows:

That is, a basic chip rate is about 1.23 Mcps, and as current accommodated user rates, there are two rates of a 14.4 kbps sequence and a 9.6 kbps sequence. The forward channel includes a pilot channel that all mobile users use commonly, and under a precondition that base stations are synchronous, seamless handover (soft handover) is achieved by acquiring pilot synchronization.

Pilot channel signals are used in estimation of radio channel and coherent detection, or measurement of a base station transmitted signal level.

Further as a signal reception system, there is adopted a RAKE combining reception system. That is, maximal-ratio combining is performed on signals corresponding to different paths received in multipath environment, whereby a received signal is obtained.

It is important in receiving a CDMA signal to perform initial synchronization acquisition and synchronization tracking processing with high rate.

In a CDMA communication, it is planned to increase a bit rate to 64 kbps to enable communications of character information and image information besides speech information. Under a condition that such high rate signal processing is required, capabilities of a synchronization tracking system in the above-mentioned conventional receiver are not necessarily sufficient.

Accordingly if a phase of a received signal rapidly shifts before tracking processing is started after the initial synchronization is established, it is expected that the worst problem may occur that already established synchronization is lost. This case causes the necessity to perform the initial synchronization acquisition processing again.

For example, under such a condition that a mobile station such as an automobile moves along a slop with a height variation with very high speed, when the soft handover is performed, there is expected a case that a phase of a received signal rapidly shits due to switching between base stations, and thereby the synchronization is lost before the tracking processing starts working.

The use of a digital signal processor (DSP) is considered to speed up the tracking processing. In this case, however, power consumption is increased because software loop processing is repeated many times. Further it is considered that capabilities for the other processing in the DSP be decreased by an amount corresponding to an additional program for reception processing.

The present invention is carried out based on the consideration as described above. It is an object of the present invention to reduce the time taken to start the synchronization tracking processing without increasing loads on software and without increasing power consumption, and to speed up the tracking control.

SUMMARY OF THE INVENTION

The reason for the long time taken to start tracking processing in a conventional receiver is that a pilot filter to remove a noise from a pilot signal is present in a control loop.

In the present invention, the pilot filter is arranged externally of a path (loop) to perform the synchronization tracking processing. That is, the pilot filter is arranged independently to enable the filtering processing of a pilot symbol and tracking control processing to be performed concurrently.

According to this constitution, it is possible to speed up the processing required to determine a throw amount (a shift amount in reception timing) because it is not necessary to perform the filtering processing of the pilot signal, and consequently to perform smooth synchronization tracking control. Further this constitution does not cause such problems that a load on software is increased and power consumption is increased.

In one aspect of a CDMA receiver of the present invention, at least one pilot filter, which performs filtering on a pilot symbol transmitted from a base station to decrease an interference component, is provided externally of a signal processing loop for synchronization tracking. It is thereby possible to concurrently process the filtering of the pilot symbol and signal processing for the synchronization tracking.

Since the throw amount is determined without waiting for the processing with the pilot filter to be finished, the time taken from signal reception to start tracking control is reduced. Thereby, in performing a soft handover, such an inconvenience hardly occurs that once established synchronization is lost.

Further in another aspect of the CDMA receiver of the present invention, data indicative of the throw amount of a reception timing is generated from a table (look-up table system) when the synchronization tracking is performed while shifting the reception timing per a predetermined interval basis. Then a relationship between inputs and outputs in the table is updated using synchronization establishment information transmitted from the base station.

In the IS-95 CDMA communication system, the forward channel includes a think channel and handover assist channel besides the pilot channel and traffic channel. A mobile station side always receives synchronization establishment information (useful information for synchronization establishment) transmitted from the base, station. Accordingly when the soft handover is performed, the mobile station side knows phase information of a pilot channel signal of the base station to which the communication is switched. The use of the information achieves faster convergence of a tracked phase as compared to a case that tracking control is started under a condition of no preliminarily knowledge. Accordingly tracking control performance is further improved.

Furthermore, in the other aspect of the CDMA receiver of the present invention, a time constant of the pilot filter is updated using information concerning automatic frequency control.

A pilot signal component varies due to carrier frequency offset of a local oscillator at a receiver side, frequency shift caused by fading, and other facts. A range that the pilot signal component is considered to be in (frequency band) is estimated using the information from an automatic frequency control circuit (AFC circuit), and the time constant of the pilot filter (width of a passing band) is changed dynamically. That is, at the time of the soft handover, since a variable parameter value in the AFC circuit is changed, according to the change, the time constant of the pilot is also changed.

It is thereby possible to decrease noise components (interference components) effectively to detect the pilot signal accurately, and therefor to improve a received quality in obtaining a demodulated signal from a received signal. As a result, it is possible to prevent the deterioration of the received quality in performing the soft handover.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENT

An embodiment of the present invention will be described specifically with reference to accompanying drawings.

Figure 1:
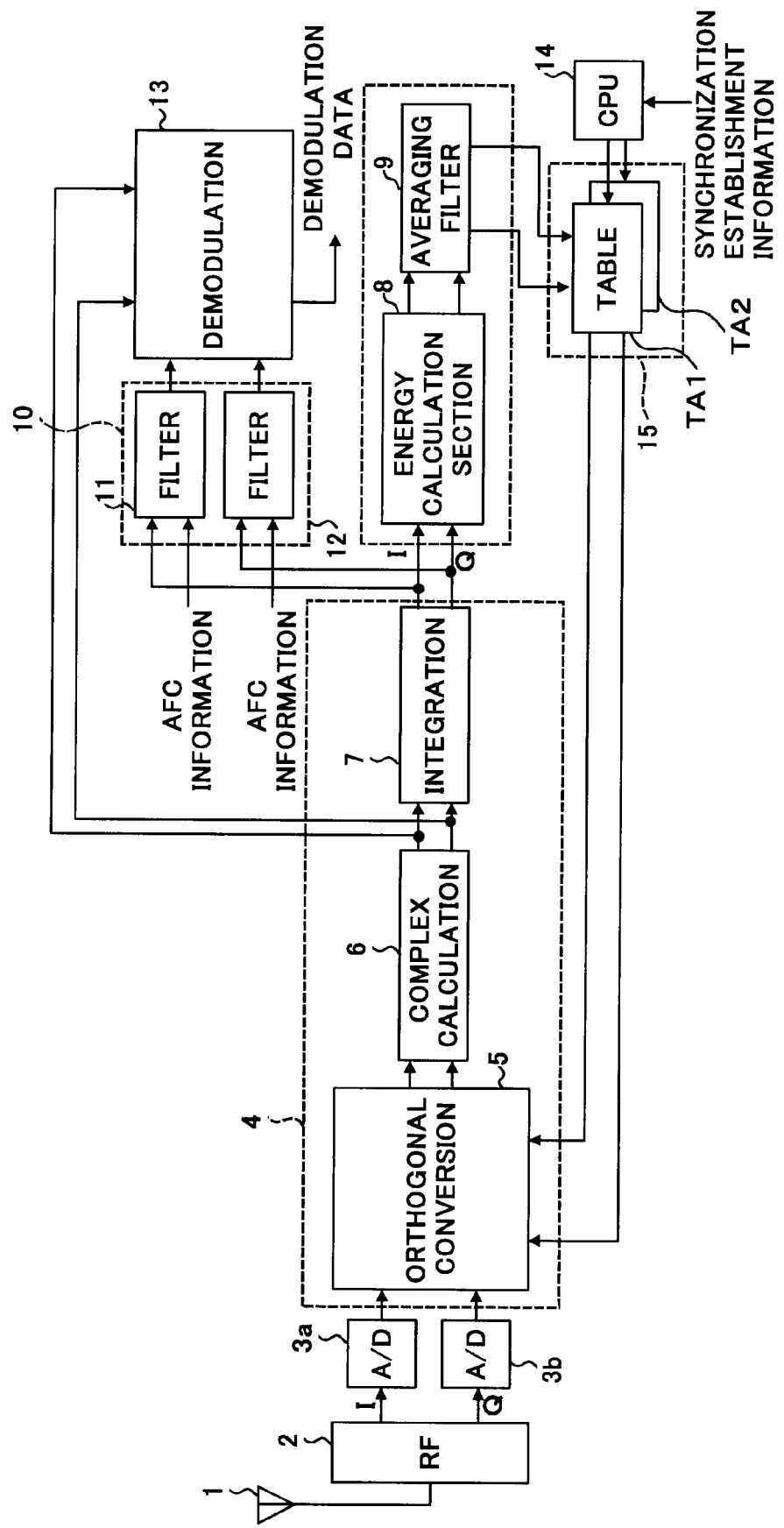
FIG. 1 is a block diagram illustrating an entire configuration of a CDMA receiver according to one embodiment of the present invention.

FIG. 1 is a block diagram illustrating an entire configuration of a CDMA receiver according to one embodiment of the present invention.

As illustrated in FIG. 1, the CDMA receiver has antenna 1, radio processing section 2, A/D converters 3a and 3b, despreading section 4 having orthogonal conversion section 5, complex calculation section 6 and integration section 7, pilot filter section 10 having band pass filters 11 and 12, demodulation section 13, time tracking section 16 having energy calculation section 8 and averaging filter 9, CPU (microprocessor) 14, and search section 15 having I signal table TA1 and Q signal table TA2.

One of features of the CDMA receiver is that pilot filter section 10 is arranged independently of a loop for synchronization tracking processing configured with time tracking section 16 and search section 15. It is thereby intended to enable filtering processing of a pilot signal and the synchronization tracking processing to be performed concurrently. As a result, in performing the soft handover, the time taken to start synchronization tracking control becomes, for example, within a time corresponding to one symbol. In a conventional configuration, it takes a time corresponding to two or more symbols to start the synchronization tracking control.

Another feature of the receiver of this embodiment is that CPU (microprocessor) 14 sets data indicative of a throw amount (phase shift amount) for each base station in tables TA1 and TA2 in search section 15 using synchronization establishment information transmitted from a base station.

Then tables TA1 and TA2 are accessed using an output from averaging filter 9 in time tracking section 16 as an address variable to output appropriate throw amount data (look-up table system). It is thereby possible to efficiently and quickly capture the pilot signal from another base station to newly start communicating with, and to prevent synchronization from being lost.

Further, the other feature of the present invention is to dynamically change a time constant (width of a passing band) of the pilot filter using information from the automatic frequency control (AFC) circuit. It is thereby possible to reduce noise components effectively to detect the pilot signal with high accuracy, and therefore to prevent the deterioration of a received quality (received quality at the time of the soft handover) in obtaining a demodulated signal from a received signal.

Figure 8:
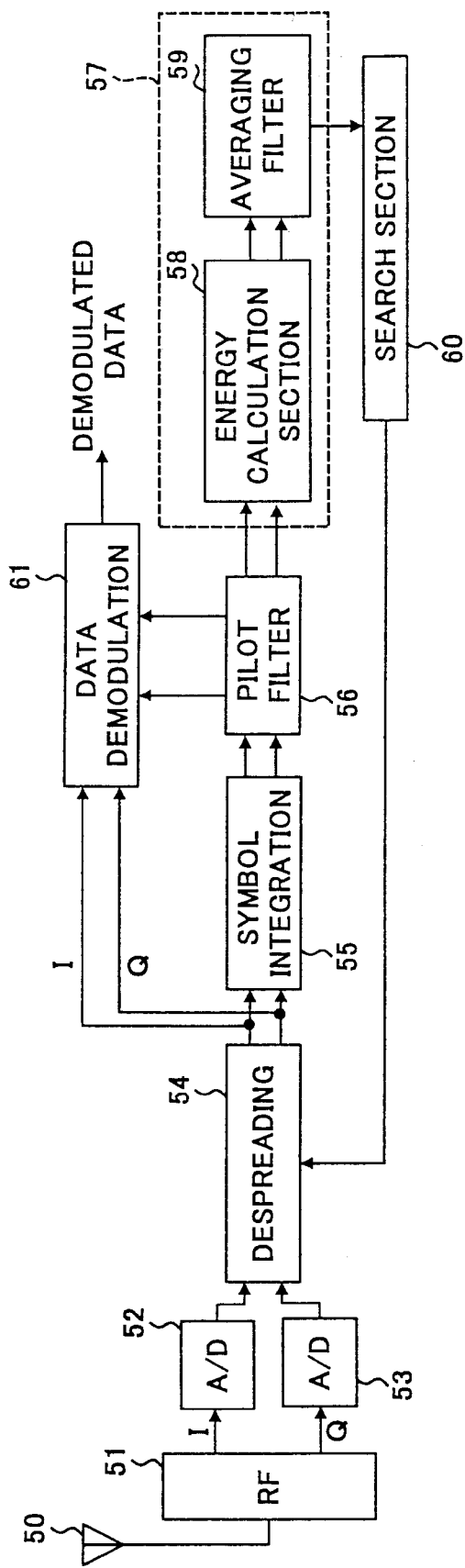
FIG. 8 is a block diagram illustrating an exemplary configuration of a conventional CDMA receiver (as comparison).

The features of the receiver of the present invention as described above will be further apparent by comparing it with a configuration of a conventional receiver (comparison example) illustrated in FIG. 8. In the following, the configuration and operation of the receiver according to this embodiment of the present invention are first explained, and then the comparison with the comparison example is performed.

The following explains the basic function and operation of each section of the CDMA receiver in FIG. 1.

A/D converted I signal and Q signal are input to orthogonal conversion section 5 in despreading section 4. A timing of the orthogonal conversion is adjusted finely corresponding to throw amount data with a resolution per ±⅛ chip basis transmitted from search section 15.

Complex calculation section 6 performs a predetermined complex calculation when the pilot signal is detected. Further complex calculation section 6 multiplies received data by a PN signal (spreading code) to perform despreading.

Integration section 7 performs integration over one symbol (64 chips). In addition, complex calculation section 6 and integration section 7 share the same sum calculation processing circuit. Sharing a hardware resource for calculation enables the reduction of an IC chip area.

The basic function and operation of time tracking section 16 are next explained.

Energy calculation section 8 performs calculation of $I^2+Q^2$ for each chip to calculate an energy for each chip. Then energy calculation section 8 calculates a difference of the energy between the nth chip and the (n+1)th chip to output.

Averaging filter 9 calculates an average energy of 64 chips. The average energy is calculated by performing accumulation of data corresponding to 64 chips, and then obtaining a mean value by subtraction.

A noticeable point herein is to be able to perform the time tracking operation and filtering processing of the pilot signal concurrently. It is thereby possible to start the synchronization tracking control faster in performing the soft handover. Accordingly a situation does not occur that the synchronization is lost when a base station is switched in the middle of performing a large amount of communications.

The function and operation of search section 15 are next explained.

This search section 15 uses table TA1 (for I signal) and table TA2 (for Q signal) to output throw amount data. As described previously, it is possible to set the throw amount of reception timing per ±⅛ chip basis.

Another noticeable point herein is that the relationship between outputs and inputs in each table is not fixed, but updated as appropriate. The update is performed by the CPU (microprocessor) based on the synchronization establishment information (control information) transmitted from the base station.

Figure 5:
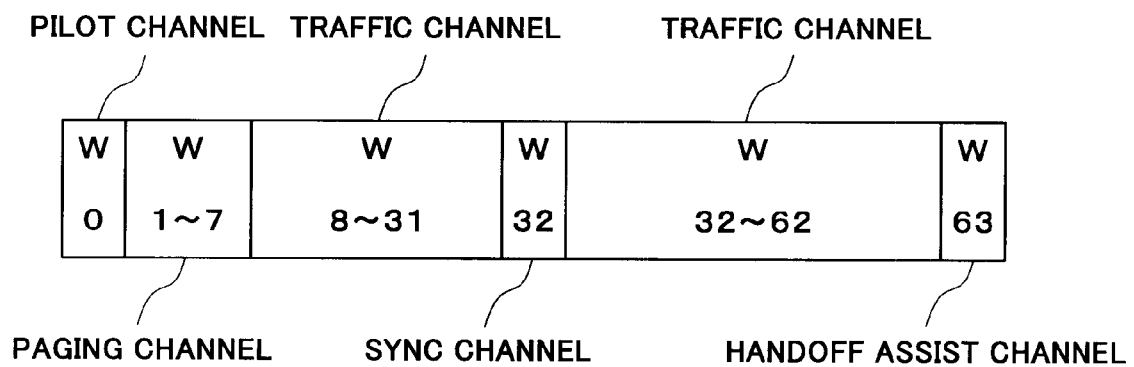
FIG. 5 is a diagram illustrating an example of a CDMA forward channel configuration in the IS-95 standard.

FIG. 5 is a diagram illustrating an exemplary configuration of a CDMA forward channel conforming to the IS-95 standard.

As illustrated in FIG. 5, the forward channel has a pilot channel (W0), sync channel (S32), paging channel (W1 to W7), traffic channel (W33 to W62) and handoff assist channel (W63).

Sync channel (W32) contains a synchronization channel message. A mobile station demodulates the synchronization channel message transmitted from the base station, performs predetermined processing on demodulated data, and obtains system constitution information containing, for example, phase offset of the pilot channel signal and system timing with respect to the base station (useful information for synchronization establishment, in other words, one of the synchronization establishment information).

That is, by the use of such information, at the time of the soft handover, the mobile station can obtain a phase difference between an absolute reference and an initial phase of the pilot signal of the base station to which the communication is switched (in other words, offset amount), and thereby performs the synchronization tracking control efficiently.

This point is explained more specifically.

Figure 6:
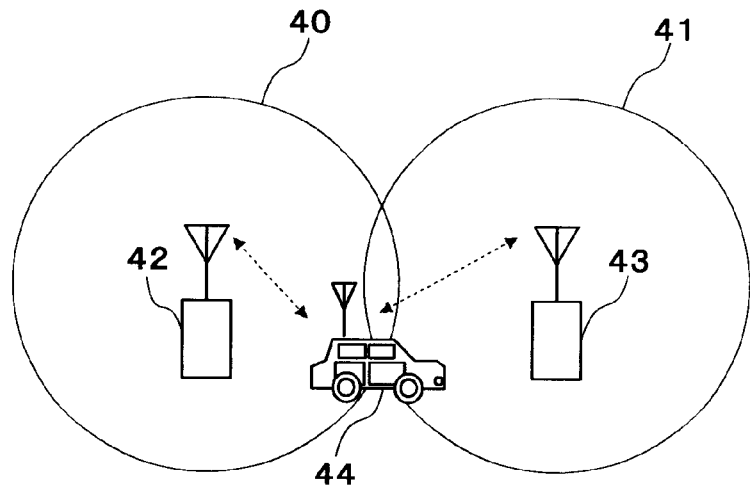
FIG. 6 is a diagram to explain a soft handover in a CDMA communication.

FIG. 6 illustrates a schematic position relationship between mobile station 44 and base stations 42 and 43 when the soft handover is performed. Mobile station 44 is trying to switch the commination from base station 42 to base station 43. In addition in FIG. 6, reference numbers 40 and 41 respectively denote cover areas of base stations 42 and 43.

When the mobile station communicates with base station 42, tables TA1 and TA2 internal included in search section 15 in FIG. 1 have such a relationship between inputs and outputs that as the throw amount, "±⅛" is output when the absolute value of an output level of averaging filter 9 is equal to or less than a threshold "L1", while "±⅜" is output when such a value exceeds "L1".

Then when mobile station 44 in FIG. 6 switches the communication source from base station 42 to base station 43, CPU (microprocessor) 14 in FIG. 1 rewrites data in tables TA1 and TA2 using the synchronization establishment information for base station 43 that is already obtained. Thereby, the relationship between the inputs and outputs in each of the tables is thereby updated to be appropriate to acquire synchronization with transmission signals from base station 43.

As a result of the update, for example, in tables TA1 and TA2, the relationship between the inputs and outputs is changed so that as the throw amount, "±⅜" is output when the absolute value of the output level of averaging filter 9 is equal to or less than the threshold "L1", while "±⅝" is output when such a value exceeds "L1".

It is thereby possible to efficiently perform the synchronization tracking control promptly when the base station is switched, whereby the situation does not occur that the synchronization is lost.

The function and operation of pilot filter section 10 in FIG. 1 are next explained.

Pilot filter section 10 has filter 11 for the I signal and filter 12 for the Q signal, and each filter works to remove interference signals from the pilot signal. The pilot signal varies due to carrier frequency offset of a local oscillator at a receiver side, frequency shift due to fading, and other facts.

In the receiver in FIG. 1, switching of characteristics of the automatic frequency control circuit (AFC circuit) at the time of the soft handover is paid attention, and time constants (widths of passing bands) of pilot filters 11 and 12 are changed dynamically corresponding to the switching.

It is thereby possible to decrease noise components (interference components) effectively also at the time of performing base station switching, whereby the S/N ratio is improved.

That is, it is possible to detect the pilot signal accurately, and to prevent the deterioration of the received quality at the time of the soft handover.

The AFC circuit is such a circuit that is generally provided at a front end of a receiver for the purpose of setting a carrier frequency offset between a transmission side and receiver side to be within a predetermined frequency range.

At the time of the soft handover, variable parameters such as a control voltage in the AFC circuit are changed on demand. Accordingly, for example, by referring to parameter values when the frequency offset enters into the predetermined range, it is possible to estimate extents of effects of fading and propagation environment variation on the received signal.

Then the information (control information) on the AFC circuit is input to pilot filters 11 and 12 to change the cut-off frequencies of the filters dynamically. Using pilot signals obtained from pilot filters 11 and 12 as references, coherent detection is performed in demodulation circuit 13.

The functions and operations of main sections of the CDMA receiver in FIG. 1 are as described above.

Figure 2:
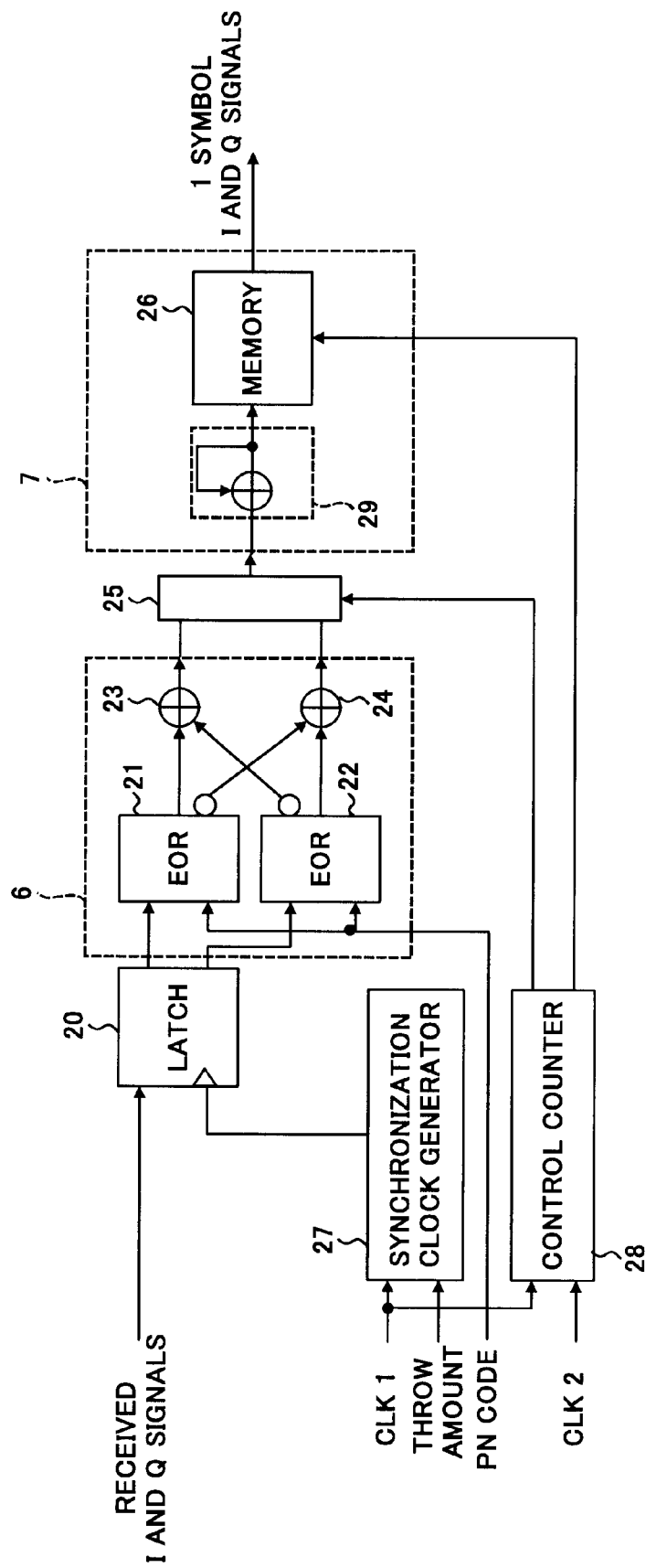
FIG. 2 is a circuit diagram illustrating a configuration of a despreading section (complex calculation section and integration section) in the embodiment of the present invention.
Figure 3:
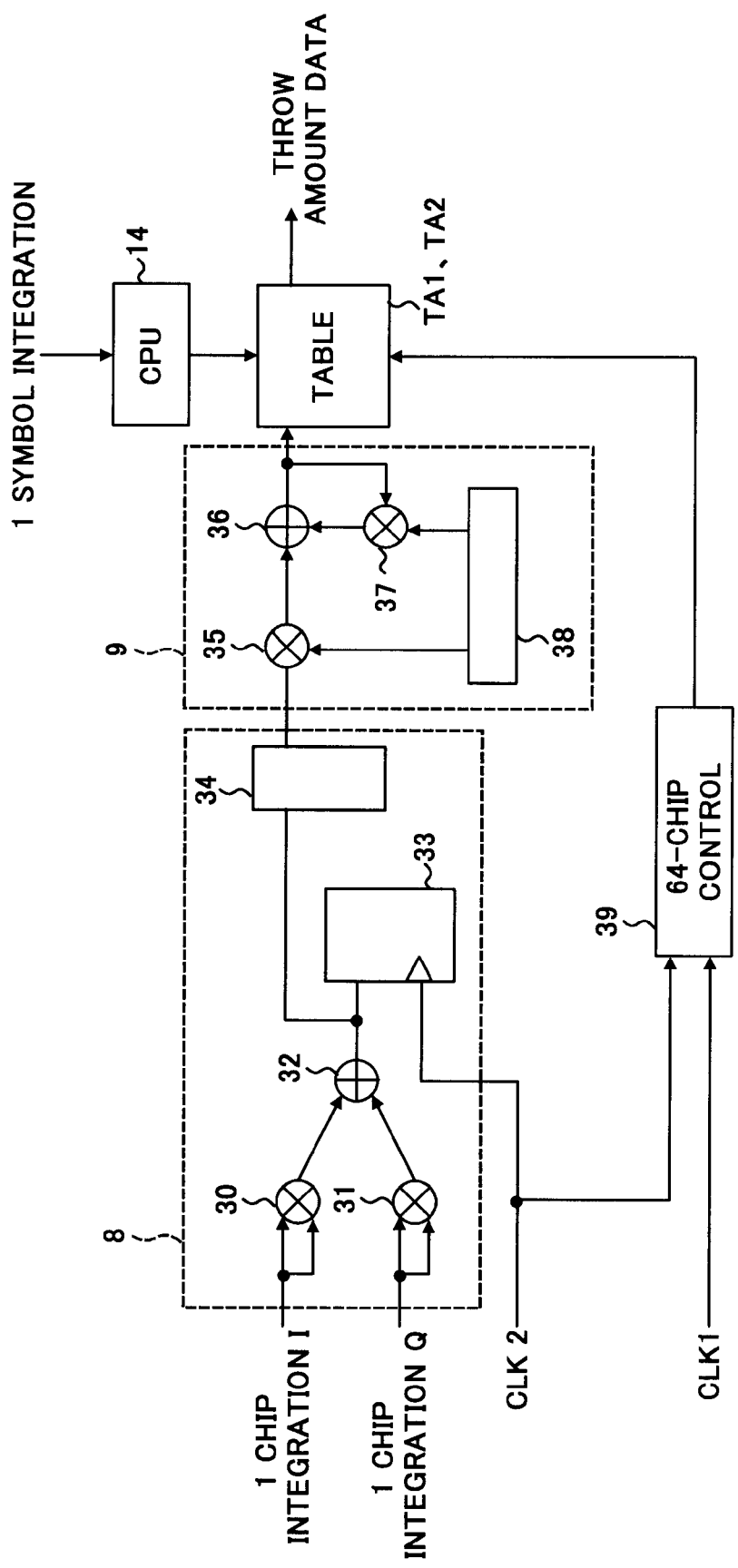
FIG. 3 is a circuit diagram illustrating a configuration of a section that performs tracking control processing in the embodiment of the present invention.
Figure 4:
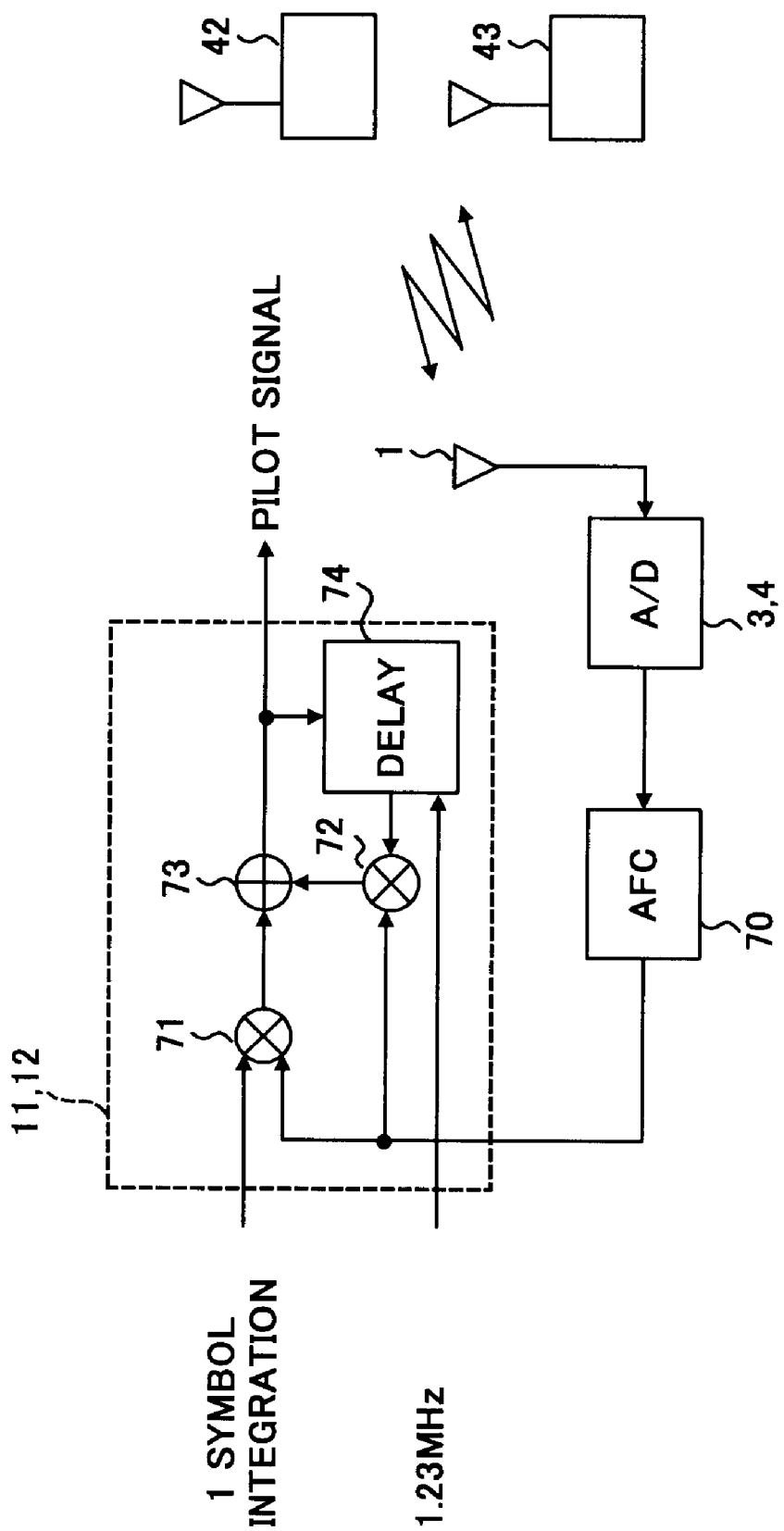
FIG. 4 is a circuit diagram illustrating a configuration of a section that performs pilot filtering processing in the embodiment of the present invention.

A specific example of a circuit configuration in each section is next explained using FIGS. 2, 3 and 4.

FIG. 2 illustrates an exemplary circuit configuration of despreading section 4 in FIG. 4.

As illustrated in FIG. 2, received I and Q signals are once latched in latch circuit 20, and then output to complex calculation section 6. The latch timing is controlled by an output clock from synchronization clock generator 27.

Synchronization clock generator 27 generates a synchronization clock based on reference clock CLK1 (9.8 MHz) and the throw amount data (per ±⅛ basis) transmitted from search section 15.

Complex calculation section 6 is comprised of exclusive OR circuits 21 and 22, and addition circuits 23 and 24. An output from complex calculation section 6 is inputted to integration section 7 through I and Q signals selection circuit 25. Integration circuit 7 is comprised of IIR type digital filter 8 and memory circuit 26. In addition, operation timings of I and Q signals selection circuit 25 and memory circuit 26 are controlled by control counter 28.

FIG. 3 illustrates an exemplary circuit configuration of time tracking section 16.

As illustrated in FIG. 3, energy calculation section 8 has multipliers 30 and 31, adder 32, register (delayer) 33, and subtraction circuit 34 that calculates a difference between the nth chip and the (n+1)th chip. Multiplies 30 and 31 perform energy calculation of $I^2+Q^2$.

Averaging filter 9 has multipliers 35 and 37, adder 36, and circuit 38 that outputs a coefficient to determine the time constant of the filter, as a configuration to performing accumulation of data corresponding to 64 chips to average. As described previously, the data of tables TA1 and TA2 can be updated by CPU (microprocessor) 14.

These tables TA1 and TA2 are further given a timing signal every 64 chips from 64-chip control circuit 39.

FIG. 4 illustrates an exemplary circuit configuration in pilot filter section 10.

As illustrated in FIG. 4, pilot filters 11 and 12 are IIR filters comprised of multipliers 71 and 72, adder 73 and delayer 74. The time constants (i.e., multiplication coefficients) of the IIR filters are updated using information from AFC circuit 70 (such as values of parameters when the offset inters into the predetermined range).

As described above, in the present invention, the hardware configurations are designed to improve reception processing capability per one symbol. Accordingly even if the reception data rate is increased to 64 kbps (8k×8ch), it is possible to sufficiently ensure the reception reliability of reception at the time of the soft handover, and to prevent the deterioration of the received quality.

Further the load on the software is not increased, and power consumption is not increased largely either.

Figure 7:
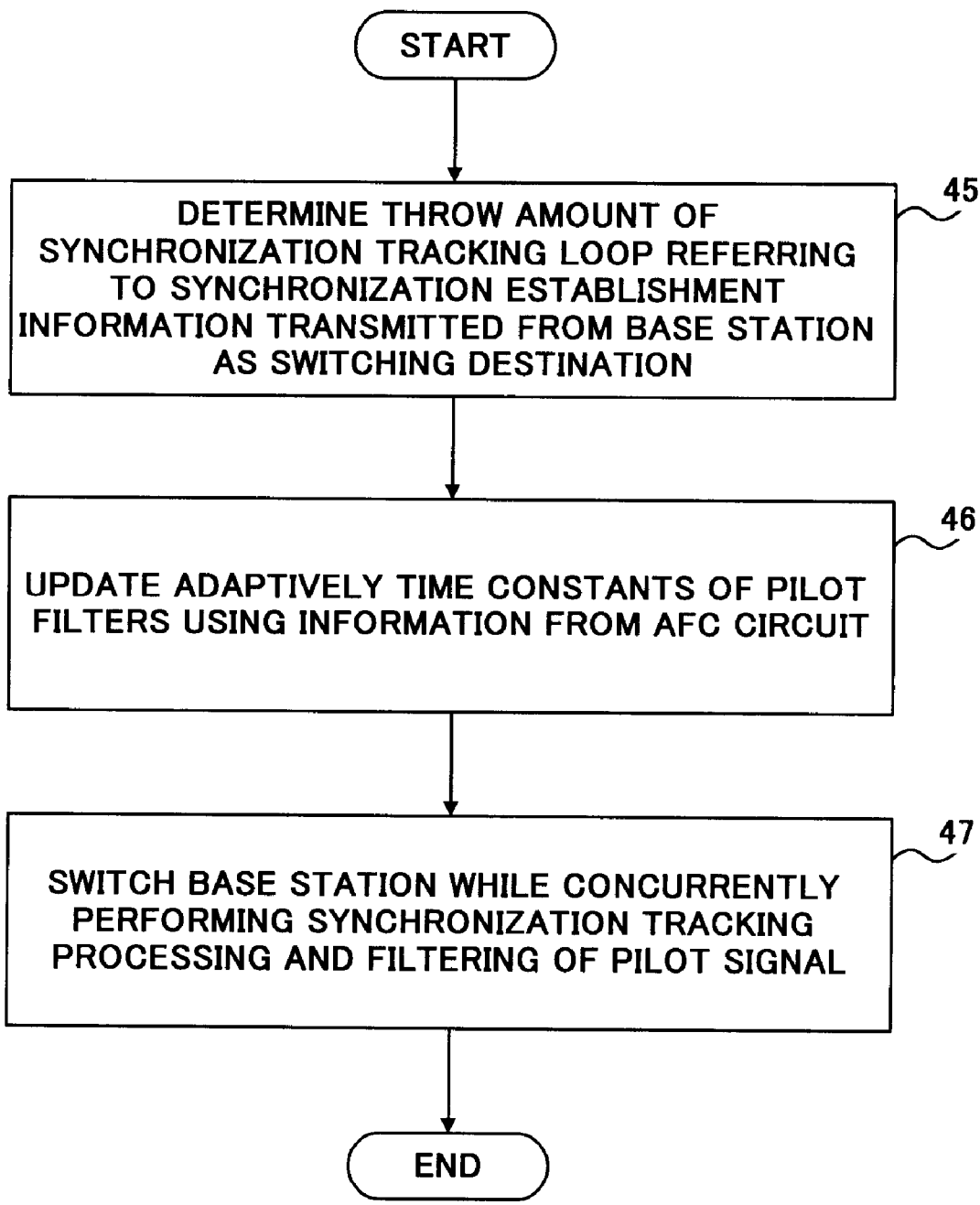
FIG. 7 is a flow diagram illustrating procedures to perform the soft handover using the CDMA receiver of the present invention.

FIG. 7 illustrates procedures performed when the soft handover is performed using the CDMA receiver of the present invention.

As illustrated in FIG. 7, the throw amount of a synchronization tracking loop is determined by referring to the synchronization establishment information transmitted from the base station as switching destination (step 45). Then the time constants of the pilot filters are adaptively updated using the information from the AFC circuit (step 46). The base station is switched, while concurrently performing the synchronization tracking processing and filtering processing of the pilot signal (step 47).

The configuration of the receiver of the present invention (FIG. 1) as described above is compared with the configuration of the conventional example in FIG. 8.

The receiver as the conventional example in FIG. 8 has, as illustrated in FIG. 8, antenna 50, radio signal processing section (RF section) 51, A/D converters 52 and 53, despreading circuit 54, symbol integration circuit 55, pilot filter 56 that removes interference signals by filtering to obtain a pilot symbol, time tracking section 57 having energy calculation section 58 and averaging filter 59, and search section 60.

The time constant (window width) of pilot filter 56 is fixed. Further search section 60 compares an output value from averaging filter 59 with a predetermined reference value, and according to the difference, determines a shift amount of a reception timing. The shift amount (throw amount) can be set per ±⅛ chip, which is the same as in the receiver of the present invention.

In the receiver in FIG. 8 with the configuration as described above, an adjustment of the throw amount by the synchronization tracking control is performed after despreading, symbol integration, pilot filtering and time tracking is finished.

Accordingly there is a time lag until actual tracking control (closed-loop control) is performed after the time the received signal is received. The consideration by the inventors of the present invention found out that the time lag corresponds to at least two symbols. In other words, the tracking control is started two-symbol duration later after I and Q signals are received.

To reduce the above-mentioned time lag, it is considered to perform processing from the despreading to averaging filtering using a DSP (digital signal processor). In this case, however, power consumption is increased due to the fact that the loop processing is performed repeatedly. Further it is considered that an increase of a program for RAKE reception processing provides adverse effects on capabilities for the other processing in the DSP.

On the contrary, in the case of the CDMA receiver of the present invention (FIG. 1), the pilot filter does not lie between the tracking control loop, whereby the time lag is made within a range corresponding to one symbol. Further using the synchronization establishment information transmitted from the base station, the throw amount is adaptively determined, and synchronization tracking performance (synchronization tracking rate) is adaptively changed, thereby achieving the tracking control with high rate. Meanwhile the time constants of the pilot filters provided independently are set using the information from the AFC circuit. Accordingly the risk does not occur that the filtering performance deteriorates. In other words, it is possible to extract the pilot signal accurately as well as the conventional receiver.

As explained above, according to the present invention, it is possible to perform the tracking control rapidly in performing a soft handover, and thereby to prevent the occurrence of such a situation that already established synchronization is lost.

Further the use of information transmitted from a base station enables the tracking control at the time of the soft handover to be performed efficiently. Furthermore, in performing the soft handover, the time constants of the pilot filters are changed dynamically using the information from the automatic frequency control (AFC) circuit, whereby such a problem does not occur that the S/N ratio of a received pilot signal is decreased.

As described above, according to the present invention, it is possible to reduce the time taken to start the synchronization tracking processing, and to speed up the tracking control, without increasing the load on the software, and without increasing the power consumption.

The present invention is not limited to the above described embodiments, and various variations and modifications may be possible without departing from the scope of the present invention.

This application is based on the Japanese Patent Application No.HEI11-194726 filed on Jul. 8, 1999, entire content of which is expressly incorporated by reference herein.

What is claimed is:

1. A CDMA receiver having:
   a pilot filter, provided externally of a signal processing loop for synchronization tracking, which performs filtering on a pilot symbol transmitted from a base station to decrease an interference component; and a table storing shift amounts in a phase of a received signal to determine a capability of the synchronization tracking, wherein said CDMA receiver performs the filtering of the pilot symbol and signal processing for the synchronization tracking concurrently and updates a relationship between inputs and outputs in said table using synchronization establishment information transmitted from the base station.

2. The CDMA receiver according to claim 1, further having:

an automatic frequency control circuit (AFC) to set carrier frequency offset between a transmission side and a reception side to be within a predetermined frequency range, wherein said CDMA receiver updates a time constant of said pilot filter using information from said automatic frequency control circuit (AFC).

3. A CDMA receiver having:

a signal processing loop for synchronization tracking;

a pilot filter, provided externally of said signal processing loop for the synchronization tracking, which performs filtering on a pilot symbol transmitted from a base station to decrease an interference component;

a table storing shifts amounts in a phase of a received signal to perform the synchronization tracking while shifting a reception timing per a predetermined time interval basis using said signal processing loop for the synchronization tracking; and an automatic frequency control circuit (AFC) to set carrier frequency offset between a transmission side and a reception side to be within a predetermined frequency range, wherein a relationship between inputs and outputs in said table is updated adaptively using synchronization establishment information transmitted from the base station, and a time constant of said pilot filter is updated adaptively using information from said automatic frequency control circuit (AFC).

4. The CDMA receiver according to claim 3, wherein said signal processing loop for the synchronization tracking has a received-signal energy calculation section.

* * * * *